Figures 1, 2:
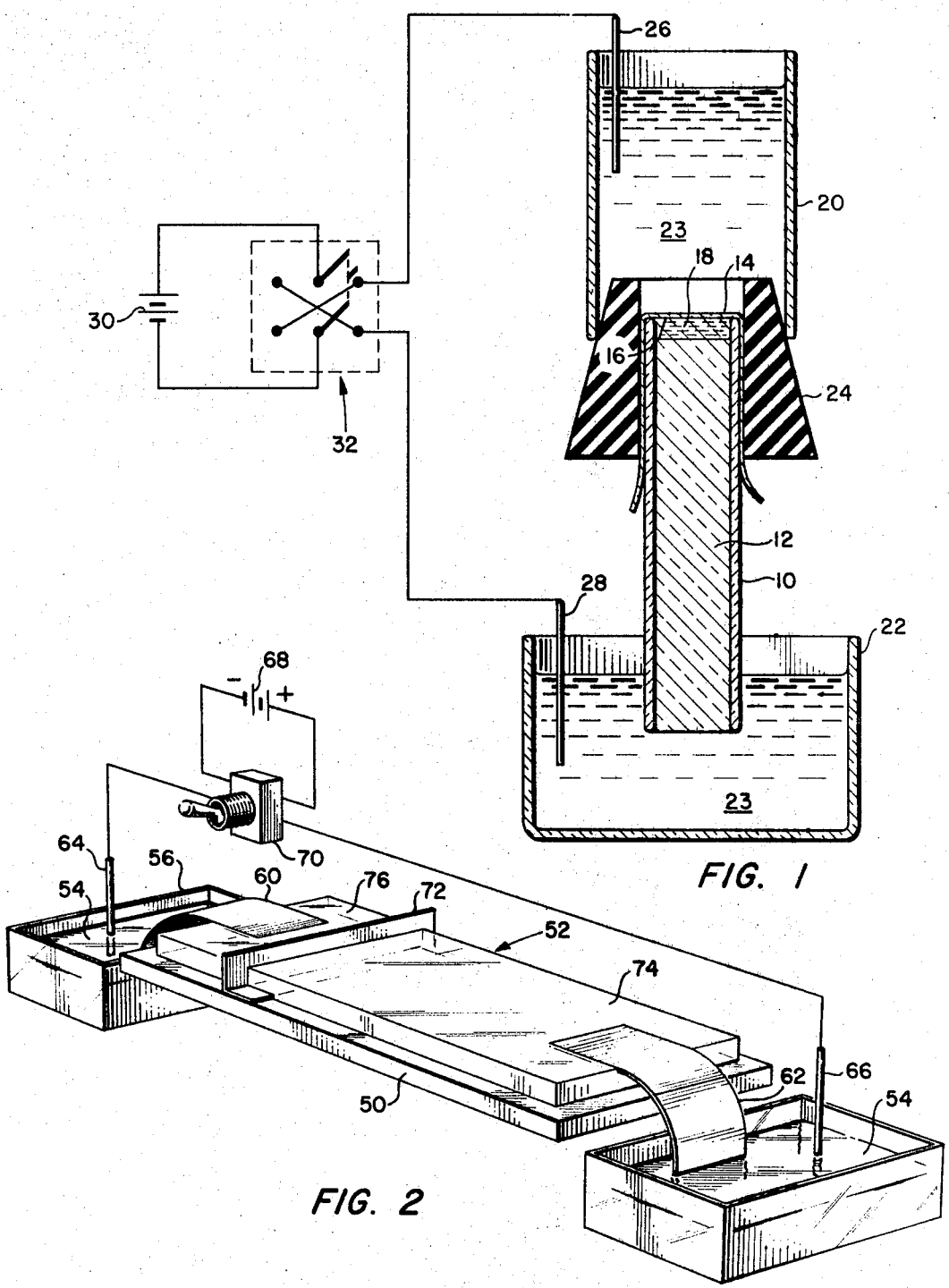

United States Patent [19]
Juhos

[11] 3,720,593
[45] March 13, 1973

[54] METHOD FOR HIGH RESOLUTION ZONE ELECTROPHORESIS

[75] Inventor: Eva Th. Juhos, Mountain View, Calif.

[73] Assignee: Beckman Instruments, Inc.

[22] Filed: Jan. 17, 1972

[21] Appl. No.: 218,613

Related U.S. Application Data

[62] Division of Ser. No. 587,013, Oct. 17, 1966, abandoned.

[52] U.S. Cl................................204/180 G, 204/299
[51] Int. Cl. ................................................B01k 5/00
[58] Field of Search....204/180 P, 180 G, 180 R, 299

[56] References Cited

UNITED STATES PATENTS

| 2,625,374 | 1/1953 | Neuman | 255/1.8 |
| 3,290,240 | 12/1966 | Neren | 204/299 |
| 3,326,790 | 6/1967 | Bergrahm | 204/180 |
| 3,341,441 | 9/1967 | Guiffrida et al. | 204/180 |

Primary Examiner—John H. Mack
Assistant Examiner—A. C. Prescott
Attorney—Thomas L. Peterson et al.

[57] ABSTRACT

A method of separating particles by zone electrophoresis by applying a potential gradient in one direction, allowing particles to migrate and build-up against a barrier, then reversing the current to allow the particles to migrate away from the barrier.

2 Claims, 2 Drawing Figures

EVA TH. JUHOS
INVENTOR.

BY Louis Mok

ATTORNEY

METHOD FOR HIGH RESOLUTION ZONE
ELECTROPHORESIS

This is a division of my copending application Ser. No. 587,013, filed Oct. 27, 1966 now abandoned, entitled METHOD AND APPARATUS FOR HIGH RESOLUTION ZONE ELECTROPHORESIS, assigned to the assignee of the present application.

This invention relates generally to zone electrophoresis and more particularly to a method and an apparatus for performing zone electrophoresis in which rapid, high resolution separations are obtained.

Electrophoresis, in general, is the migration of particles in an electrolytic carrier medium under the influence of an electric field. This phenomenon can be used to separate particles which are chemically similar but which exhibit distinctive surface electrical properties. As a result of these distinctive electrical properties, the mobilities of various classes of charged particles in the carrier medium, under the influence of the electric field, will be different. Particles having the same electrical properties migrate together in specific, identifiable zones.

According to one method of separating charged particles by zone electrophoresis, a sample containing the particles is applied to an electrolytic carrier medium in the form of a porous substance or a gel-like matrix such as agar. This material has suitable structural strength so it may be molded into various shapes such as blocks, slabs and cylinders or the like and the composition may be controlled to produce the desired pore sizes. A potential gradient applied to the gel causes the various particles to migrate through the interstices of the gel. Particle size, surface charge and other factors, including the size of the pores or interstices, determine the rate of migration. Large pores allow fast migration of large particles such as protein; small pores act as a partial or full barrier, slowing or completely stopping the migration of larger particles. Particles whose migration velocity is the same will migrate in specific zones which may be analyzed quantitatively and qualitatively by methods well known in the electrophoresis art. The direction of migration of a particular particle will depend upon the polarity of its surface charge.

One disadvantage of prior zone electrophoresis methods and apparatus in which a gel matrix is utilized, is that unless the initial sample is carefully applied as a thin line, electrophoretic separation is slow and low resolution zones are produced. The narrower and sharper the zone of initial sample application, the more rapidly separation occurs and the more highly resolved the resulting electrophoretic separations will be. Applying the initial sample as a thin, sharp line however, is difficult to accomplish and reproducibility is poor.

Accordingly, it is the overall object of the present invention to provide a method and apparatus for accomplishing zone electrophoresis yielding rapid, high resolution separations.

In accordance with one specific, exemplary form of the present invention shown and described herein, there is provided a novel method and apparatus for practicing same, in which the sample particles are initially moved in the carrier medium by an electrical potential gradient against a "barrier" through which ordinary ions will pass but which is impermeable to the particles of interest, these particles being of macromolecular size. The particles of interest concentrate at the barrier in the form of a fine line or film which provides a sharply localized initial sample. The polarity of the potential gradient is then reversed and the particles concentrated at the barrier begin to migrate in a direction away from the barrier. The electrophoresis which now takes place results in sharply defined particle zones susceptible of highly accurate analysis.

The novel features which are believed to be characteristic of the invention are set forth with particularity in the appended claims. The invention itself, however, together with further objects and advantages thereof can best be understood by reference to the following description taken in connection with the accompanying drawings in which:

FIG. 1 shows an elevation view, in section, of an exemplary embodiment of an apparatus which may be used to practice the present invention; and FIG. 2 is a perspective view of another exemplary embodiment of an apparatus for practicing the invention.

Referring now to the drawings, there is shown in FIG. 1 a zone electrophoresis device comprising generally a carrier medium support means which may take the form of an open-ended tube 10. The tube 10 is packed with an electrophoresis carrier medium 12 typically comprising a gel such as agar, starch, acrylamide or the like. The tube may be oriented in any convenient direction; in the specific, exemplary configuration depicted, the tube 10 is vertically disposed and supported by means of a suitable clamping arrangement (not shown).

A barrier means is provided across the tube 10 to stop the migration of particles of interest while permitting the passage of ordinary ions. In the embodiment shown in FIG. 1, the barrier is in the form of a membrane 14 stretched across the open top of the tube 10 and in contact with the carrier medium inside. An interface 16 is thereby defined at the junction of the membrane 14 and the carrier medium 12. The membrane 14 may be fabricated of any suitable material so long as it is impermeable to the particles of interest yet provides a conductive path for the electrical potential gradient applied to the carrier medium. For the separation of certain types of proteinaceous matter, cellophane has been found to be a satisfactory barrier membrane.

The barrier need not be in the form of a membrane, however. A firm gel, that is, one having small pores through which larger particles of interest cannot pass, may be utilized. The firm gel may be cast along with the carrier medium (a relatively weak, or large pore gel) forming two gel zones or portions defining an interface between.

The sample, containing the particles of interest which are to be separated, may be pre-mixed with the gel or introduced in other well known ways, as by diffusion, for example. In the apparatus of FIG. 1, the sample-containing portion of the gel, denoted by the reference numeral 18 is precast with the carrier medium 12 and is located adjacent the the upper end of the tube 10. The position of the sample along the length of the tube is immaterial, except that it is desirable to have the sample located initially near the barrier so that the time required for the particles of interest to migrate to the barrier is minimized.

Electrode vessels 20 and 22, containing a buffer solution 23 with an appropriate pH, are provided adjacent the upper and lower ends of the tube 10. The vessel 20 may be conveniently fabricated of a length of glass or plastic tubing. The vessel 20 is held in place over the upper end of the tube 10 by a tapered, rubber support 24 having a central hole 25 which fits snugly over the upper portion of the tube 10. The support 24 may double as a clamp to hold the membrane 14 in place. With the arrangement shown, the buffer solution 23 in the vessel 20 is in contact with the upper surface of the membrane 14. The lower portion of the tube 10 is immersed in the buffer solution 23 contained in vessel 22, the lower end of the gel in the tube 10 being thereby brought into contact with the buffer.

The vessels 20 and 22 are provided with electrodes 26 and 28, respectively, and a d.c. potential from a battery 30 or other suitable supply is applied between the electrodes. A means for selectively reversing the polarity of the electric field between the electrodes 26 and 28 may also be provided. This may take the form of a double-pole, double-throw switch 32 connected to the electrodes 26 and 28 and to the supply 30 in a well known fashion so that with the switch in one position the electrode 26 will be positive with respect to the electrode 28 and with the switch 30 in the other position the polarity of the electrodes will be reversed.

In operation, assuming a protein sample is utilized, the switch 32 is positioned so that the upper electrode 26 acts as the anode. The proteinaceous matter then moves up to and concentrates in a thin film at the membrane barrier 14. The polarity of the electrodes 26 and 28 is then reversed, causing the particles of interest to migrate downwardly in the carrier medium undergoing electrophoretic separation into highly resolved, distinct zones.

Turning now to FIG. 2, the alternative apparatus depicted therein includes an elongated, horizontally disposed, flat glass plate 50 for supporting a carrier medium in the form of a suitable gel film 52. The ends of the film 52 are connected to the buffer solutions 54 in the electrode vessels 56 and 58 by filter paper wicks 60 and 62, respectively. Electrodes 64 and 66 connect the buffer solution in the electrode vessels 56 and 58 with a suitable d.c. supply 68 through a polarity reversing means such as the double-pole, double-throw switch 70. A barrier, in the form of a membrane 72, as described in connection with FIG. 1, and supported by the plate 50, extends upwardly from the plate and across the film 52 thereby dividing the film into two portions 74 and 76. The sample may be applied in any suitable manner to the film portion 74. The operation of the device of FIG. 2 is essentially the same as that described for FIG. 1, consisting generally in electrophoretically moving the particles of interest toward the barrier for concentration there followed by reversal of the polarity of the potential gradient to effect particle separation.

Instead of employing a membrane barrier in the apparatus of FIG. 2, it is also feasible to form the film portion 76 of a firm gel, the film portion or carrier medium 74 comprising a relatively weak gel. The particles will then concentrate at the interface defined by the two film portions in the manner already described.

It will be obvious to those skilled in the art that various modifications may be made to the specific exemplary embodiments of the invention described. While particular embodiments have been discussed, it will be understood that the invention is not limited thereto and that is is contemplated to cover in the appended claims any such modifications as fall within the true spirit and scope of the invention.

What is claimed is:

1. A method for separating particles by zone electrophoresis, comprising the steps of
   applying to an electrolytic carrier medium a quantity of sample including said particles, said medium having a barrier impermeable to said particles;
   applying to said carrier medium a potential gradient in a first direction causing said particles to migrate toward said barrier and concentrate at said barrier;
   removing said potential gradient; and
   applying to said carrier medium a potential gradient in a second direction to cause said particles to migrate away from said barrier and undergo electrophoretic separation.

2. A method of obtaining rapid, high resolution electrophoretic separations of particles by electrophoresis, comprising the steps of
   applying to an electrolytic carrier medium a quantity of a sample including said particles, said medium having a barrier impermeable to said particles;
   applying to said carrier medium a potential gradient the polarity of which causes said particles to migrate toward said barrier and concentrate in the form of a thin film at said barrier and
   reversing the polarity of said potential gradient to cause said particles to migrate away from said barrier and undergo electrophoretic separation in said carrier medium.

* * * * *